United States Patent [19]

Hall

[11] 4,195,792

[45] Apr. 1, 1980

[54] EXPANDABLE MANDRELS

[76] Inventor: Melvin D. Hall, Rte. 6, Box 621-C, Thomasville, N.C. 27360

[21] Appl. No.: 968,287

[22] Filed: Dec. 11, 1978

[51] Int. Cl.² ................. B65M 75/24; B23B 31/40
[52] U.S. Cl. ................................ 242/72 B; 279/1 Q
[58] Field of Search .............. 242/68.4, 72, 72 B; 279/1 Q, 2 A, 2; 269/48.1

[56] References Cited

U.S. PATENT DOCUMENTS

| | | | |
|---|---|---|---|
| 2,290,739 | 7/1942 | Chapman | 242/72 B |
| 2,711,863 | 6/1955 | Grettve | 242/72 |
| 2,801,694 | 8/1957 | Schneider | 164/70 |
| 3,295,188 | 1/1967 | Sayeressig | 29/113 |
| 3,552,672 | 1/1971 | Grettve | 242/72 |
| 3,904,144 | 9/1975 | Gattrugeri | 242/72 B |
| 3,937,412 | 2/1976 | Damour | 242/72 B |
| 4,030,415 | 6/1977 | Fellows | 101/382 R |
| 4,114,909 | 9/1978 | Taitel | 279/1 Q |

Primary Examiner—Edward J. McCarthy

[57] ABSTRACT

An improved sleeve construction for mandrels of the type which grip tubular members such as paper rolls by selectively expanding a rubber or other deformable material sleeve into gripping relation with the inner wall surface of the tubular members wherein the sleeve is sealed at the opposite ends thereof to the mandrel shaft and air is introduced against the inner wall of the central portion of the sleeve to expand it. The sleeve itself is tubular in shape and formed of a rubber material with alternating portions of arcuately long, radially thick, dimensionally stable, first segments separated by arcuately short, radially thin, dimensionally deformable, second segments. The short thin segments are expanded responsive to the introduction of air against the inner wall thereof while the longer, thicker segments include an outer surface which is moved into gripping relation with the tubular members responsive to expansion of the second segments. When the sleeve is expanded, the radially thin segments are dimensionally deformed and stretched causing the effective diameter of the sleeve to increase, even though the dimensions of the larger, thicker segments are not themselves deformed and stretched to any appreciable extent.

8 Claims, 6 Drawing Figures

EXPANDABLE MANDRELS

BACKGROUND OF THE INVENTION

Paper and plastic sheet material provided on tubular rolls or cores are conventionally utilized in various industries by subjecting the material on the core to an unwinding process during which time the paper or plastic is printed upon. As the paper or plastic is wound or unwound on the tubular rolls, the rolls or cores are mounted on shafts that are journaled at one or both ends in bearings and are either driven or restrained in such a manner that the web is under constant tension. One device commonly used for holding such rolls is referred to as an expandable mandrel in which a sleeve is secured to a shaft by vulcanizing or in other similar manner. After the roll or core is slipped onto the sleeve, air is introduced through the shaft and up against the inner wall of the sleeve (the ends being secured by vulcanizing or the like to the end portions of the shaft), whereupon the sleeve or bladder, which is formed of a resilient material, expands into gripping engagement with the inner surface of the roll or core.

Various problems can arise to the user of such devices. One such problem occurs at the point where the ends of the sleeve are vulcanized or sealed to the shaft. After a period of use, leaks or failures in the vulcanization can occur which results in improper seating of the roll. In such instances, the entire mandrel must be returned to the manufacturer for refurbishing or repair. This requires the stocking of spare mandrels, which is expensive. The alternative of course is for the machine to remain idle until the mandrel is returned, which is not an acceptable alternative. Another situation which can occur is if the operator inadvertently activates the air before the roll is in place or after it is removed. In such cases the sudden rush of air against the relatively thin bladder or sleeve causes the sleeve to rupture. This also results in lost time for the mandrel in sending it back for factory repair.

Several United States Letters Patent including those to Damour U.S. Pat. No. 3,937,412; to Taitell No. 4,114,909; and to Grettze No. 3,552,672 are exemplary of other types of expandable mandrels in which a bladder or tube is expanded against metal ribs or segments to push the metal ribs or segments into engagement with the inner wall surface of the rolls or tubes. However, such construction suffers the same disadvantage that if a leak occurs, the mandrel must be returned for factory maintenance. It is also questionable as to whether the surface of the metallic segments or ribs will provide as good and positive engagement with the inner wall of the core or roll as will a rubber material which has a higher coefficient of friction. Further, each of the devices shown in the patents listed above is relatively complicated, and therefore considerably more expensive than an improved simple bladder approach as is described herein.

Another patent which is somewhat similar to those described above is that to Saueressig U.S. Pat. No. 3,295,188. The mandrel illustrated therein, however, suffers from the same defficiency as that first described in that it is vulcanized to the shaft, thereby creating problems with maintenance which are desired to be overcome by the present invention.

SUMMARY OF THE PRESENT INVENTION

The present invention, on the other hand, is directed to an improved expandable mandrel and particularly to an improved sleeve or bladder for an expandable mandrel which overcomes the problems outlined hereinabove. The sleeve according to the present invention is clamped at each end onto the shaft, rather than being vulcanized, so that if one sleeve or bladder fails, a spare sleeve may be slipped on in its place and easily clamped into place by any workman, and the mandrel is immediately ready for reuse. Further, even though the sleeve is formed entirely of rubber or a similar material, it is so constructed and reinforced that if air is inadvertently applied to the sleeve when no roll is in place, the strength of the sleeve itself will prevent rupture or blowout thereof.

Toward this end, the mandrel according to the present invention includes a shaft mounted at one end for rotation and having a free opposite end over which the tubular members, rolls or cores are positioned and removed. As in other similar mandrels, there is provided an expansible gripping means selectively moved between a first release or relax position in nongripping relation to the inner wall surface of the tubular members and a second expanded position in gripping relation to the inner wall surface of the tubular members. The expandable gripping means includes a substantially tubular sleeve member having relatively short end portions of a diameter less than the inner diameter of the tubular members and a relatively long intermediate gripping portion. The aforementioned end portions are clamped in substantially air tight relation to the shaft adjacent each end thereof with the intermediate gripping portion there between lying in unconnected relation over the corresponding intermediate portion of the shaft.

The gripping portion of the sleeve is formed of a hard rubber material with a plurality of radially thickened, relatively stiff, dimensionally stable, first arcuate segments separated by alternating radially thin, dimensionally deformable, second arcuate segments.

The shaft includes an air passageway therein with one end of the air passageway connected to a source of compressed air and the other end of the passageway in communication with the inner wall of the tubular cover, whereby when the sleeve is expanded by the introduction of air, the radially thin, dimensionally deformable segments are stretched, causing the effective diameter of the sleeve to increase, even though the dimensions of the larger, thicker segments are not themselves deformed and stretched to any appreciable extent.

Because the sleeves are clamped onto the shaft, when the sleeves become worn or for other reason must be replaced, it is only necessary to release the clamps, insert a new sleeve, and tighten the clamps again, such as the wellknown operation of replacing a radiator hose in an automobile. Also, during use, the fact that the major peripheral portion of the sleeve is formed by the relatively thick, dimensionally stable segments, will prevent rupture of the sleeve in case the air is inadvertently activated while no roll or core is placed thereover. The rubber outer surface of the relatively long arcuate segments provides an excellent gripping material against the inner surface of the cores, which surface will not slip and which will positively transfer the rotational motion from the shaft to the roll.

It is therefore an object of the present invention to provide an improved expandable mandrel which eliminates many of the maintenance problems realized heretofore.

It is another object of the present invention to provide a improved expandable mandrel of the type described on which the sleeve or bladder may be easily replaced on the job, without requiring return of the mandrels for factory repair.

It is yet another object of the present invention to provide an improved expandable mandrel having an air expandable sleeve, which sleeve will not rupture if air is inadvertently supplied to the sleeve prior to the time a roll or core is placed thereover.

Other objects and a fuller understanding of the invention will become apparent from reading the following detailed description of a preferred embodiment in conjunction with the accompanying drawings in which.

DETAILED DESCRIPTION OF A PREFERRED EMBODIMENT

Figure 1:
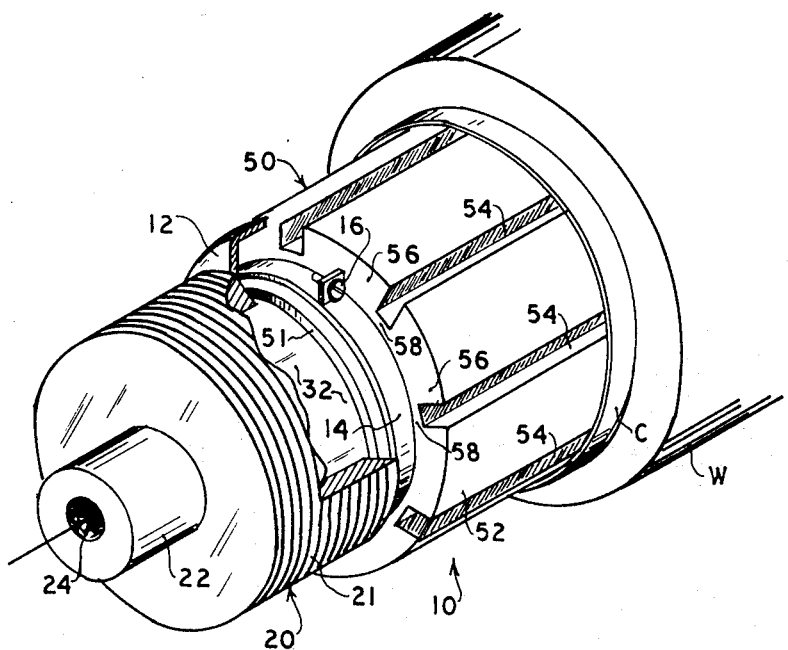
FIG. 1 is a perspective view with parts broken away illustrating the expandable mandrel according to the present invention, with a roll or core of web material partially slid thereon.
Figure 2:
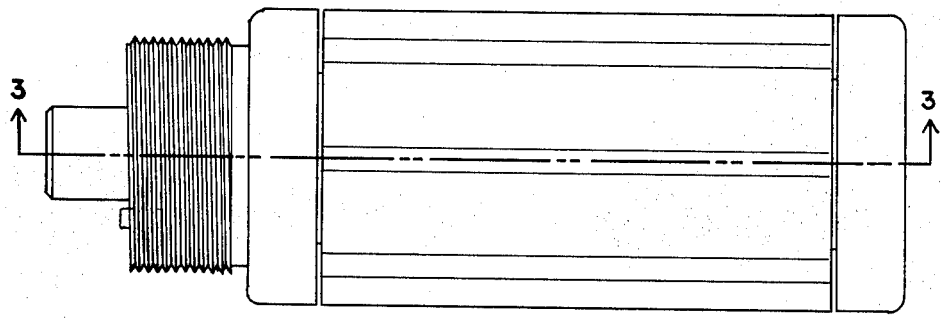
FIG. 2 is a plan view with portions broken away, of the mandrel according to the present invention.
Figure 3:
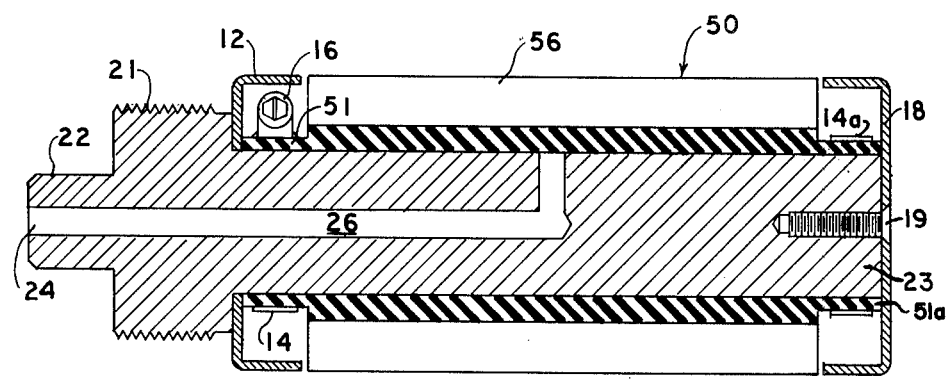
FIG. 3 is a sectional view taken substantially along lines 3—3 in FIG. 2.
Figure 4:
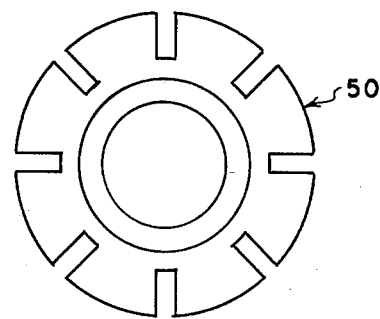
FIG. 4 is an end view of the expandable sleeve or bladder only as removed from the shaft.
Figure 5:
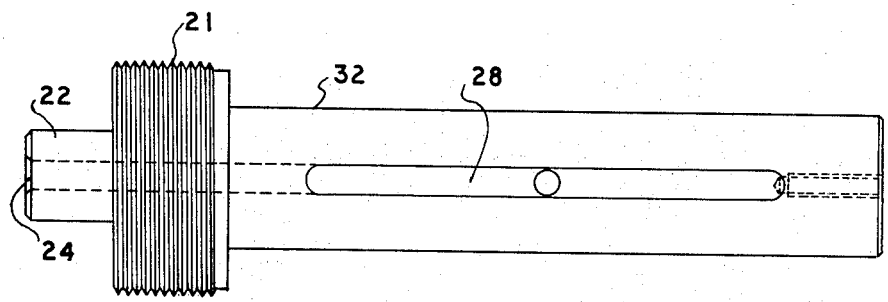
FIG. 5 is a plan view of the shaft of the mandrel with the sleeve removed.
Figure 6:
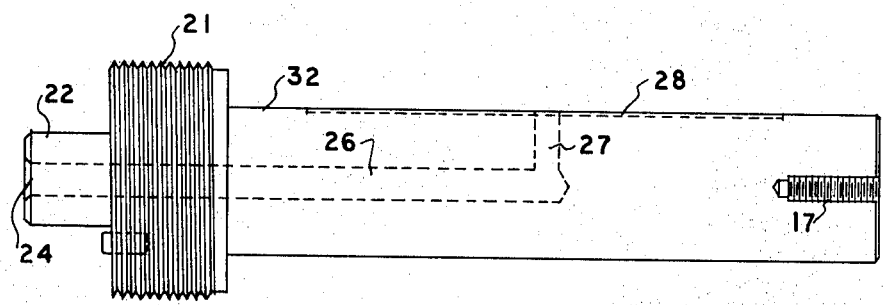
FIG 6 is a side elevation view of the shaft, again with the sleeve removed.

Referring now to the drawings, there is illustrated therein the improved expandable mandrel 10 which includes as its two major components a shaft 20 and an expandable sleeve or cover 50. In FIGS. 1, 5, and 6, there is best illustrated the shaft 20 which includes a threaded shoulder 21 of a relatively large diameter which is secured by the threads to any conventional rotating chuck means (not shown). When assembled through the chuck means, the shaft is then ready for rotation as required. A stub member or nozzle 22 extends outwardly from one end of shaft 20 and includes an inlet 24 therein into which air may be introduced to the interior of the shaft from a source of compressed air (not shown).

On the other side of the threaded shoulder 21 there extends an elongated spindle 32 of reduced diameter onto which the sleeve 50 will eventually be attached (see FIGS. 5 and 6). An axially extending passageway 26 connects the air inlet 24 with a radially extending, short passageway 27 which opens up into a shallow groove or channel extending along a portion of the surface of spindle 32.

Turning now to a discussion of the expandable sleeve 50 as best illustrated in FIGS. 1-4, the sleeve 50 includes a tubular member or sleeve 52 having relatively short end portions or shoulders 51 of a diameter less than the inner diameter of tubular members C which are being placed on the mandrel, and a relatively long intermediate gripping portion between the two end portions 51. The intermediate gripping portion is formed of a plurality of spaced, arcuately long, radially thick, dimensionally stable, first segments 56 having an outer surface which is moved into gripping relation with the tubular rolls or cores C separated by plurality of arcuately short, radially thin, dimensionally deformable, second segments 58. The second segments 58 create a purality of relatively deep grooves 54 between the first segments 56. In a preferred embodiment, the relation of the arcuate links is such that the ratio of the first segements 56 to the width of the grooves 54 is approximately 4:1, however it should be apparent that other ratios might prove satisfactory.

The sleeves 52 are formed preferably of a rubber or other yieldable material which have a relatively high coefficient of friction. Because of the radial thickness of the first arcuate segments 56, when air is introduced through passageway 26 and 27 against the inner wall of the sleeve 52, the radially thin segments 58 are caused to deform and stretch, as illustrated in FIG. 4a. Even though the radially thick sections 56 do not deform, the stretching of the intermediate segements 58 will cause the effective diameter of the sleeve 50 to increase and move into gripping relation with the inner wall of the core C. The thickness and bulk of the dimensionally stable segments 56 will reinforce the sleeve and prevent rupture thereof so that failure does not occur, even though a roll or core C is not at the time mounted thereon when air is supplied under pressure.

In order to assemble the sleeve 50 onto the shaft 20, the sleeve 50 is slipped over the free end of the shaft 20 with the shoulder 51 nearest the enlarged shoulder 21 slid beneath a clamp 14, whereupon a screw and nut assembly 16 are tightened to secure the clamp 14 down against the end portion 51. It should be recognized that there is a protective and decorative cap 12 that covers the short end portion 51 of the sleeve 50 nearest shoulder 21. A second, similar clamp 14a is provided on the opposite end portion 51a to clamp the other end down against the spindle 32. A second cap 18 which covers the second end portion 51a is secured to the end of spindle 32 by means of a screw 19 which is passed through an opening in the cap 18 and into a threaded bore 17 in the spindle 32.

In operation, the arcuately long, radially thick, dimensionally stable first segments 56 are moved into gripping relation with the inner wall of the tubular member or core C responsive to the aforementioned expansion of the sleeve 50. Such expansion occurs when the arcuately short, radially thin, dimensionally deformable second segments 58 are expanded responsive to the introduction of air through the passageway 26, 27 and into the space between the sleeve 50 and the spindle 32 formed by the elongated slot 28 thereunder. There results an improved expandable mandrel which is less likely to rupture or fracture than those heretofore known, even though the sleeve 50 is formed of a single, unitary construction and of a rubber or other resilient material which has substantially greater frictional engagement with the wall when expanded.

While a preferred embodiment of the invention has been described in detail herein above, it is apparent that various changes and modifications might be made without departing from the scope of the invention, which is set forth in the claims herein below.

What is claimed is:

1. An expandable mandrel for gripping tubular members such as paper rolls or cores and the like against the inner wall thereof comprising:
    (a) a shaft mounted at one end for rotation and having a free end over which said tubular members are selectively positioned and removed;

(b) an expansible gripping means selectively moved between a first release or relaxed position in non-gripping relation to the inner wall surface of said tubular member and a second expanded position in gripping relation to the inner wall surface of said tubular member said expansible gripping means including:
  (i) a substantially tubular sleeve having relatively short end portions of a diameter less than the inner diameter of said tubular member and a relatively long intermediate gripping portion, said end portions being secured in substantailly air tight relation to said shaft adjacent said one end and said free end with the intermediate gripping portion there between lying in unconnected relation over the corresponding portion of said shaft;
  (ii) said gripping portion formed of a hard rubberlike material having a plurality of spaced radially thickened, relatively stiff, dimensionally stable, first arcuate segments separated by alternating radially thin, relatively yieldable, second segments;
  (iii) said sleeve being moveable between the relaxed position with the inner wall of said sleeve lying on said shaft and said gripping portion out of engagement with said inner wall of said tubular member, and a gripping position in which the arcuate length of said radially thin separating portions is stretched and elongated, whereby said radially thickened arcuate segments are moved radially into engagement with the inner wall surface of said tubular members;
(c) said shaft including an air passageway therein with one end of said passageway connected to a source of compressed air and the other end of said passageway in communication with the inner wall of said sleeve.

2. The expandable mandrel according to claim 1 wherein the arcuate length of said first segments is greater than the arcuate length of said second segments.

3. The expandable mandrel according to claim 2 wherein the ratio of the arcuate length of said first segments to said second segments is 4:1.

4. The expandable mandrel according to claim 1 wherein a clamp surrounds each of the short end portions of said sleeve and releasably secures said sleeve to said shaft.

5. An improved expandable sleeve for mandrels of the type which grip tubular members such as paper rolls by selectively expanding a sleeve into gripping relation with the inner wall surface of the tubular member, wherein the sleeve is secured at the opposite ends thereof to the mandrel shaft and air is introduced against the inner wall of the intermediate portion of the sleeve to expand it, said improved sleeve comprising:
  (a) a substantially tubular member formed of a rubberlike material and including alternating portions of radially thick, dimensionally stable, first arcuate segments separated by radially thin, dimensionally deformable, second arcuate segements;
  (b) said second segments being expanded responsive to the introduction of air against the inner wall of said sleeve;
  (c) said first segments having an outer surface which is moved into said gripping relation with the said tubular member responsive to said expansion of said second segments;
  (d) whereby when said sleeve is expanded, the radially thin segments are dimensionally deformed and stretched, causing the effective diameter of the sleeve to increase, even through the dimensions of the larger, thicker segments are not themselves deformed and stretched to any appreciable extent.

6. The expandable sleeve according to claim 5 wherein the arcuate length of said first segments exceeds the arcuate length of said second segments.

7. The expandable sleeve according to claim 6 wherein the ratio of the arcuate length of said first segments to said second segment is 4:1.

8. The expandable sleeve according to claim 5 wherein said sleeve includes relatively short end portions of a diameter less than said intermediate portion, said end portions being free of said first and second segments, whereby said sleeve may be clamped to said shaft around said end portions.

* * * * *